United States Patent [19]

Seabra

[11] Patent Number: 5,505,501
[45] Date of Patent: Apr. 9, 1996

[54] PRESSURIZED CONNECTION FOR A BRAKE SYSTEM OF AN AUTOMOTIVE VEHICLE

[76] Inventor: Helio L. Seabra, Rua Macau No. 46, Sal Paulo, Brazil

[21] Appl. No.: 252,355

[22] Filed: Jun. 1, 1994

[30]     Foreign Application Priority Data

Jun. 21, 1993 [BR] Brazil ............................. 7301040 U
Jul. 26, 1993 [BR] Brazil ................................. 9302990

[51] Int. Cl.⁶ .................................................. F16L 21/06
[52] U.S. Cl. ........................... 285/322; 285/23; 285/331; 285/921
[58] Field of Search .................................. 285/322, 323, 285/331, 175, 382, 921, 347

[56]                References Cited

U.S. PATENT DOCUMENTS

| | | | |
|---|---|---|---|
| 3,374,014 | 3/1968 | Kull et al. | 285/382 X |
| 3,560,026 | 2/1971 | Roe | 285/322 X |
| 4,445,714 | 5/1984 | Kisiel, III | 285/23 |
| 4,650,529 | 3/1987 | Guest | 285/23 X |
| 4,685,706 | 8/1987 | Kowal et al. | 285/322 |
| 4,803,053 | 2/1989 | Williamson | 285/921 X |
| 5,096,235 | 3/1992 | Oetiker | 285/921 X |
| 5,230,539 | 7/1993 | Olson | 285/323 |

FOREIGN PATENT DOCUMENTS

| | | | |
|---|---|---|---|
| 4002057 | 2/1991 | Germany | 285/323 |
| 2080467 | 2/1982 | United Kingdom | 285/323 |
| 92/20949 | 11/1992 | WIPO | 285/323 |

Primary Examiner—Randolph A. Reese
Assistant Examiner—Heather Chun Shackelford
Attorney, Agent, or Firm—Jacobson, Price, Holman & Stern

[57]                ABSTRACT

A connection is formed by a cylindrical body and a cylindrical orifice. The cylindrical body includes axial ring rims for the locking therein of a conical rim of an insert tube. The cylindrical body has triangular and trapezoidal annular reliefs for fitting the cylindrical body into the cylindrical orifice, under pressure, for the flow of brake fluid therethrough. The cylindrical body accepts the insertion of an O-ring and a sleeve with a grip which snap around a brake fluid tube inserted over the insert tube. The body is equipped with annular reliefs forming a groove where the conical rim of the insert tube is inserted after receiving a downward upper axial thrust from a press to allow the use of the insert tube in connections for brake systems with cartridge, compression type and threaded type fastening. The insert tube maintains a fixed, but non-rigid connection, so as not to suffer damages during the side to side insertion and withdrawal process for brake fluid tubes.

4 Claims, 2 Drawing Sheets

5,505,501

PRESSURIZED CONNECTION FOR A BRAKE SYSTEM OF AN AUTOMOTIVE VEHICLE

FIELD OF THE INVENTION

The present invention relates to an improvement for a pressurized connection of a brake line for an automotive vehicle, the development of which aims to drastically reduce the amount of preparation required for a "quick-lock" connection, given that the connection represents a design that, during its use, guarantees a perfect fastening and imperviousness, which are indispensable factors when dealing with brake line components of automotive vehicles.

The invention relates to a locking process of an insert tube for a quick coupling, whose development aims to allow the use of the insert tube in connections for brake systems with cartridge or pressurized type fasteners and threaded type fastening. The insert tube is maintained fixed but in a non rigid fashion, so as not to suffer damage during insertion and withdrawal of brake fluid tubes.

BACKGROUND OF THE INVENTION

Various connections of the "quick-lock" type, with axial fluid throughput, used in automotive vehicle brakes, are known. These connections represent various forms or processes of fitting and fastening to the base or to the body of the hydraulic system, in such a way as to make an efficient connection, besides guaranteeing a perfect sealing.

The most common connection design is the threaded type, guaranteeing an efficient fastening process but, on the downside, an expansive and protracted connection.

Thus, a connection type was developed where an orifice and a body of the connection include a smooth finish, of cylindrical complementary format, fitting under pressure, for which the fabrication process presented is of substantially lower cost and decreased complexity of finish. Such a design embodied various problems, since, with the existent imperfections on both surfaces, perfect sealing did not always take place, despite the rigidity of the joint.

Thus, a fabrication method was developed, in which the connection was inserted in the fitting orifice, this being made up of a multitude of axial cylindrical cuts, creating a berth for the mounting of the connection itself, with a groove for the fitting of an O-ring and another groove, of greater diameter, for the fitting of the connection, such a connection being assembled, under pressure, due to a removable and disposable assembly pin.

This fabrication method, of a better technical effect, brings in itself, several factors complicating its use and increasing the manufacturing costs. The main factor is the need to resort to a multitude of axial cylindrical cuts at the base where the connection shall be installed, resulting in a lengthy and expensive process. Another factor is that an assembly pin mounted on the connection itself is required, whose manufacture is complex and expensive, and which will be, after assembly, removable and disposable.

The current designs for the use of insert tubes includes rigidly fixed insert tubes. Considering a user, in order to facilitate insertion and withdrawal of a fluid carrier tube, they use a rocking motion, to promote pendulum movements, a practice that may damage the base of the insert tube, thus forcing the replacement of the entire connection.

SUMMARY OF THE INVENTION

In the present invention, the improvement introduced relative to the pressurized connection, for a brake fluid line of a brake system of an automotive vehicle consists of a manufacturing design in which the mentioned connection is assembled, with a fixed insert, but which allows some side to side, swinging movement of the insert, to avoid breakage during the insertion of a flexible brake line tube around the insert. The connection includes a cylindrical body having an external surface including an annular relief, with an angled lower face and an upper annular relief, with a triangular profile, having its lower surface angled and its upper surface straight, so as to form a lock when the body is inserted in a cylindrical orifice. In a lower edge of the body an annular recess is provided for accommodation of an O-ring for increased sealing of the cylindrical body inserted in the cylindrical orifice.

The connection is inserted in a straight cylindrical orifice, leading to a reduced diameter axial cylindrical orifice, for brake fluid flow, under pressure, adjustable with more precision, thanks to the molding of an annular relief to the internal surface of the subject orifice or vice-versa, the joining resulting through the triangular profile of the annular relief, following the same reasoning described above, given that the mentioned O-ring at the lower edge of the cylindrical body having an annular recess completely sealing the possible imperfections of the contact surfaces.

In the present invention, the locking process for an insert tube in connection with a quick coupling consists of the use of an insert tube, of low fabrication cost, which will remain locked but not rigidly so, allowing for rocking motion in order to facilitate the insertion and the withdrawal of a brake fluid carrying tube.

This insert tube can be used with fastening type connections by means of threading or by compression, of a smooth wall type or of the type equipped with annular fitting and locking reliefs.

BRIEF DESCRIPTION OF THE DRAWINGS

For a better understanding of the objective of the present invention, reference shall be made to the drawings, in which.

DETAILED DESCRIPTION OF THE DRAWINGS

Figure 1:
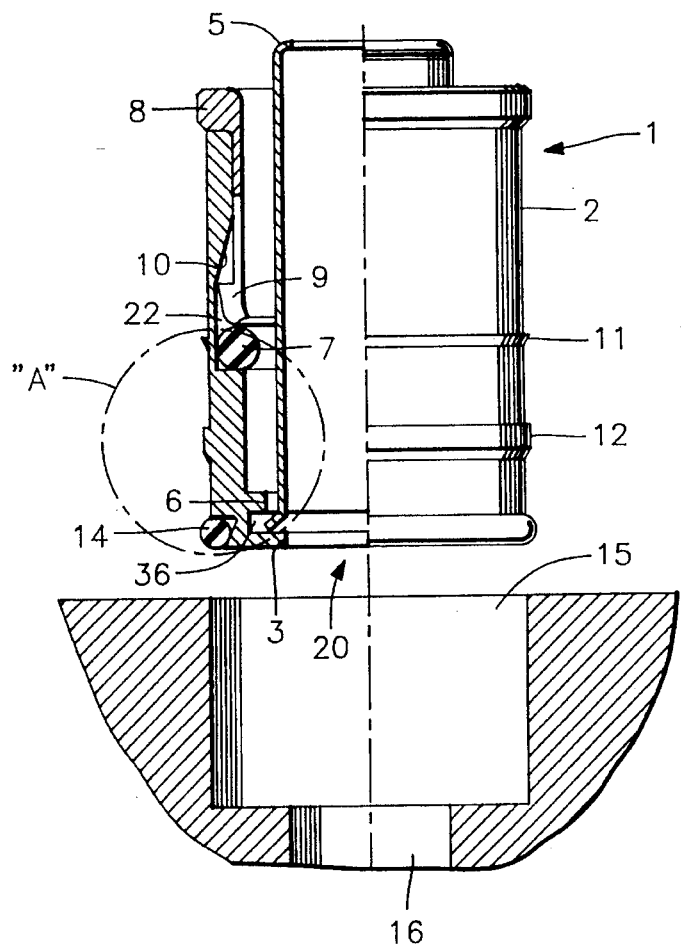
FIG. 1 shows a connection, in side view and partial cross-section, highlighting annular reliefs of the outer surface of the cylindrical body, in addition to the configuration of the cylindrical orifice, of analogous dimensions, for the fitting of the cylindrical body in the cylindrical orifice for fluid flow.

The present invention includes a connection 1, made of a cylindrical tubular body 2, with a radially inwardly extending axial narrowing 3, applied to a lower opening 20 of the cylindrical body 2 forming a support rim for a conical edge 4 of an insertion tube 5. The insertion tube opens to opening 20, after being forcibly inserted axially downwards through the cylindrical body 2 and is maintained in a locked but loose fitting condition by an annular radially inwardly extending rim 6 located just above the conical edge 4 when the insertion tube is in position.

The cylindrical body 2 has an internal annular groove 22 for the fitting of an internal O-ring 7 as well as for receiving sleeve 8 which includes grip 9 pressed towards the interior wall of the cylindrical body within annular groove 22, against the external duct wall (not visible), for the functioning of the upper angled surface 10 of the grip 9, which acts as a cam for holding a brake line inserted over insertion tube 5 between the insertion tube 5 and the sleeve 8.

The body 2 presents, at a mid-point, an annular relief 11 of a triangular profile, with an angled lower face 24, which forms a lock against a sidewall of cylindrical orifice 15. Immediately below annular relief 11 is an annular relief 12 of trapezoidal profile with an angled lower face 26, which forms a fitting and adjustment ring for insertion into cylindrical orifice 15. At a lower rim of the body 2, an annular recess 13 is formed for the fitting of the sealing O-ring 14.

The connection 1 is fitted, under pressure, in the cylindrical orifice 15 with an axial cylindrical brake fluid flow orifice 16 for receipt of brake fluid flowing through the insertion tube 5.

Figure 4:
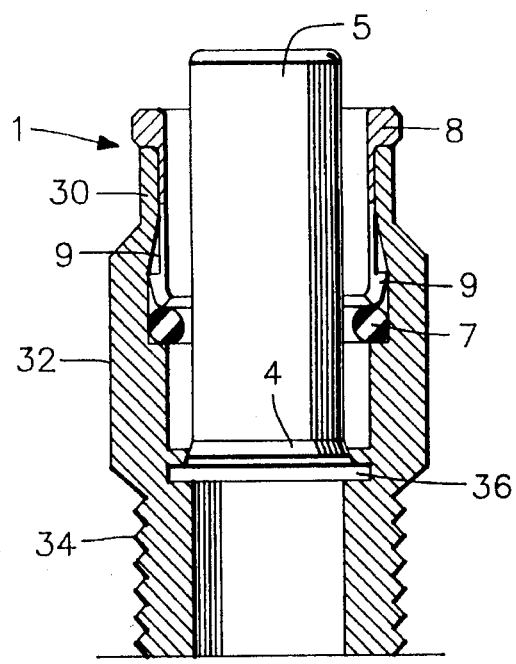
FIG. 4 shows, in vertical cross-section, the detail of the introduction of an insert tube into a body of a connection, also showing that the insert itself includes a slight conical shape in its lower extremity.
Figure 5:
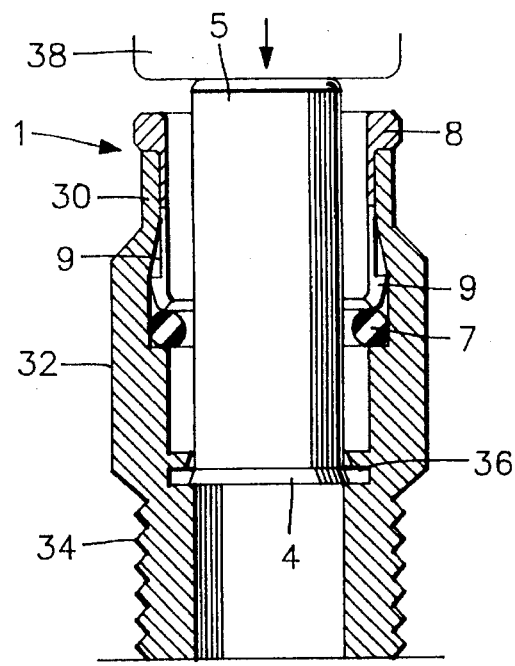
FIG. 5 shows in vertical cross-section, a detail of the application of an axial thrust on top of an insert tube, which makes the lower extremity of the insert tube pass into an annular groove thus locking the insert tube in place.
Figure 6:
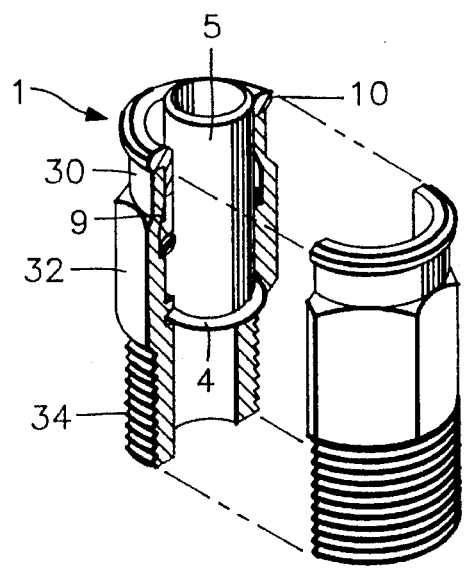
FIG. 6 shows, in exploded vertical cross-section, the insert tube fastened to a threaded type connection.

In FIGS. 4 through 6, a connection 1 is made up of a cylindrical tubular body 30, with external regular hexagonal-shaped section 32, so as to facilitate the fastening process through the threaded lower section 34, or by connection with a cylindrical tubular body 2 as shown in FIG. 1, with straight cylindrical external section, with or without external annular fitting and locking reliefs 11, 12.

The bodies 2 and 30 accept the insertion of the O-ring 7 and the sleeve 8, equipped with grip 9, which closes when its external upper relief is pulled upwards or when a fluid brake tube is pulled, snapping it.

Figure 2:
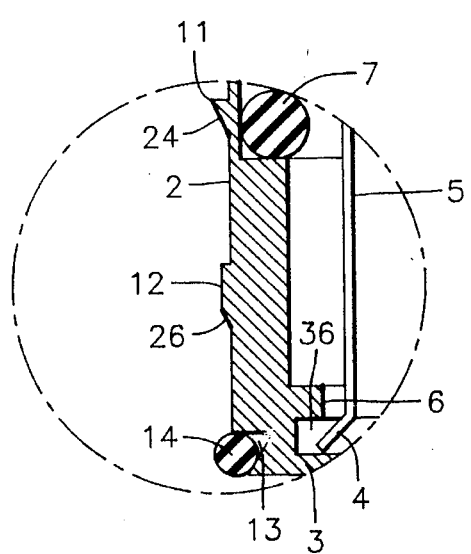
FIG. 2 shows, in lateral cross-section, detail "A" of the annular reliefs.
Figure 3:
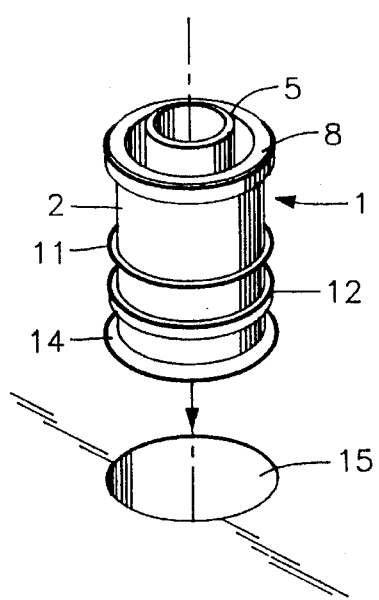
FIG. 3 shows, in exploded perspective, the insertion of the assembled subject connection to the cylindrical orifice.

The bodies 2 and 30 are equipped with an annular groove 36, where a conical rim 4 of an insertion tube 5 is inserted after receiving an upper axial thrust from the press 38 forced downwardly. The conical rim 4 forces back inwardly radially extending rim 6 to allow conical rim 4 to seat in annular groove 36. As shown in FIG. 2, the annular groove 36 formed between rims 3 and 6 allows movement of rim 4 in groove 36, thereby allowing a rocking or pendulum movement of insert tube 5 as a fluid brake tube in worked down around insert tube 5 and held in place against grip 9 and sealed by O-ring 7.

I claim:

1. A pressurized connector for a brake system of an automotive vehicle, said pressurized connector comprising:
   a unitary cylindrical tubular body having a first radially inwardly extending rim defining an axial narrowing at a lower opening of said cylindrical tubular body,
   a second inwardly radially extending rim located above said first rim and defining an annular groove between said first rim and said second rim, and
   an insert tube having a lowermost conical edge seated in said annular groove and movable within said annular groove to allow side to side movement of said insert tube,
   said body including an internal annular recess for the fitting of an internal O-ring and a sleeve disposed at least partially inside said body as an upper end having a grip with an angled upper surface, said body further including at a mid-point, a first annular relief on its outer surface with an angled lower face, and below said first annular relief, a second annular relief with an angled lower face, and at a lower rim of said body, an annular recess for the fitting of a sealing O-ring.

2. A pressurized connector for a brake system of an automotive vehicle according to claim 1, wherein said body is fitted, under pressure, in a cylindrical orifice having an axial cylindrical orifice portion for throughput of brake fluid.

3. A pressurized connector for a brake system of an automotive vehicle, said pressurized connector comprising:
   a unitary cylindrical tubular body having an external, hexagonal-shaped section, and a threaded lower section, said body including an internal annular relief for an O-ring and a sleeve equipped with a grip located in said annular relief for receiving a brake fluid tube, said body further including two radially inwardly extending rims with an annular relief located therebetween for receiving a conical rim of a tubular insert.

4. A pressurized connector for a brake system of an automotive vehicle, said pressurized connector comprising:
   a unitary cylindrical tubular body having an axial opening extending therethrough and a first radially inwardly extending rim defining an axial narrowing at a lowermost portion of said axial opening of said cylindrical tubular body,
   a second inwardly radially extending rim of said cylindrical tubular body being located above said first rim,
   an annular groove of said cylindrical tubular body being located between said first rim and said second rim, and
   an insert tube having a lowermost conical edge seated in said annular groove between said first rim and said second rim and movable within said annular groove to allow side to side movement of said insert tube.

* * * * *